US 6,871,792 B2
Mar. 29, 2005

(12) United States Patent
Pellizzari

(54) APPARATUS AND METHOD FOR PREPARING AND DELIVERING FUEL

(75) Inventor: Roberto O. Pellizzari, Groton, MA (US)

(73) Assignee: Chrysalis Technologies Incorporated, Richmond, VA (US)

(*) Notice: Subject to any disclaimer, the term of this patent is extended or adjusted under 35 U.S.C. 154(b) by 122 days.

This patent is subject to a terminal disclaimer.

(21) Appl. No.: 10/143,435

(22) Filed: May 10, 2002

(65) Prior Publication Data

US 2003/0180674 A1 Sep. 25, 2003

Related U.S. Application Data

(60) Provisional application No. 60/367,122, filed on Mar. 22, 2002.

(51) Int. Cl.$^7$ .............................. F02D 1/06; F02D 7/00; B05B 1/24; B05C 1/00; F23D 11/44
(52) U.S. Cl. .......................... 239/5; 239/136; 239/104; 431/3; 431/11; 431/208; 123/543
(58) Field of Search .............................. 239/5, 136, 13, 239/86, 104, 106, 128, 135; 123/543, 545, 548, 549, 550, 552, 557; 431/3, 11, 208, 121, 209, 243

(56) References Cited

U.S. PATENT DOCUMENTS

| 3,716,416 A | 2/1973 | Aldhart et al. |
| 4,013,396 A | 3/1977 | Tenney |

(List continued on next page.)

FOREIGN PATENT DOCUMENTS

| DE | 482591 | 2/1930 |
| DE | 19546851 | 6/1997 |
| EP | 0915248 | 5/1999 |

OTHER PUBLICATIONS

Boyle et al., "Cold Start Performance of an Automobile Engine Using Prevaporized Gasoline" SAE Technical Paper Series, Society of Automotive Engineers. vol. 102, No. 3, pp 949–957 (1993).

(List continued on next page.)

Primary Examiner—Michael Mar
Assistant Examiner—Darren Gorman
(74) Attorney, Agent, or Firm—Roberts Mlotkowski & Hobbes

(57) ABSTRACT

A method and apparatus for vaporizing liquid fuel. The apparatus includes at least one capillary flow passage, the at least one capillary flow passage having an inlet end and an outlet end; a fluid control valve for placing the inlet end of the at least one capillary flow passage in fluid communication with the liquid fuel source and introducing the liquid fuel in a substantially liquid state; a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage; and means for cleaning deposits formed during operation of the apparatus. The flow passage can be a capillary tube heated by a resistance heater or a section of a tube heated by passing electrical energy therethrough. The liquid fuel can be supplied to the flow passage at any desired pressure depending on the required mass flow rate for the application. The vaporized fuel can be mixed with air to form an aerosol having a mean droplet size of 25 $\mu$m or less to minimize ignition energy of the fuel-air mixture, promote fuel flow in an air stream, and combust the liquid fuel efficiently and cleanly.

40 Claims, 11 Drawing Sheets

U.S. PATENT DOCUMENTS

| | | | |
|---|---|---|---|
| 4,344,404 A | | 8/1982 | Child et al. |
| 4,472,133 A | * | 9/1984 | Petersen et al. ............... 431/3 |
| 4,986,248 A | | 1/1991 | Kobayashi et al. |
| 5,127,822 A | | 7/1992 | Nakayama et al. |
| 5,472,645 A | | 12/1995 | Rock et al. |
| 5,482,023 A | * | 1/1996 | Hunt et al. ................. 123/491 |
| 5,692,095 A | | 11/1997 | Young |
| 5,694,906 A | * | 12/1997 | Lange et al. ................ 123/549 |
| 5,743,251 A | | 4/1998 | Howell et al. |
| 5,813,388 A | * | 9/1998 | Cikanek et al. ............ 123/549 |
| 5,870,525 A | | 2/1999 | Young |
| 6,095,436 A | | 8/2000 | Seegers et al. |
| 6,102,687 A | | 8/2000 | Butcher et al. |
| 6,155,268 A | | 12/2000 | Takeuchi |
| 6,162,046 A | | 12/2000 | Young et al. |
| 6,169,852 B1 | | 1/2001 | Liao et al. |
| 6,189,803 B1 | | 2/2001 | Ganan-Calvo |
| 6,192,596 B1 | | 2/2001 | Bennett et al. |
| 6,195,504 B1 | | 2/2001 | Horie et al. |
| 6,200,536 B1 | | 3/2001 | Tonkovich et al. |
| 6,234,167 B1 | | 5/2001 | Cox et al. |
| 6,276,347 B1 | | 8/2001 | Hunt |
| 6,293,333 B1 | | 9/2001 | Ponnappan et al. |
| 6,315,217 B1 | * | 11/2001 | Park .......................... 239/135 |
| 6,390,076 B2 | | 5/2002 | Hunt |

OTHER PUBLICATIONS

English abstract of JP 2000 1 10666.

English abstract of DE 19546851.

English abstract of EP 0,915,248.

English translation of EP 0,915,248.

* cited by examiner

APPARATUS AND METHOD FOR PREPARING AND DELIVERING FUEL

RELATED APPLICATIONS

This patent application claims priority to Provisional Application Ser. No. 60/367,122, filed on Mar. 22, 2002, and is related to the following patent applications that are hereby incorporated by reference: "Fuel Injector for an Internal Combustion Engine;" by R. O. Pellizzari et al., filed concurrently on May 10, 2002, herewith; and "Method and Apparatus for Generating Power by Combustion of Vaporized Fuel," by R. O. Pellizzari, filed concurrently on May 10, 2002, herewith.

FIELD

The present invention relates to the preparation and delivery of fuel. More particularly, a method and apparatus according to the invention provides at least one heated capillary flow passage for vaporizing fuel.

BACKGROUND

The ability to produce finely atomized fluid sprays benefits many diverse applications including the manufacture of substrates for industry, the fueling of combustion systems, including the fueling of internal and external combustion engines, the formation of uniform-sized particles for the production of pharmaceutical products, the production of small particles for use as test standards and various applications in the electronics industry, in which thin-film deposition techniques are often employed to form resistors, capacitors and other components.

In general, the completeness and cleanliness of liquid fuel combustion depends upon the fuel/air ratio, the combustion chamber mechanical and aerodynamic design, the fuel type, the fuel injector design and the fuel droplet size distribution. A primary driver in combustion system design in recent years has been the reduction of combustion-generated emissions. This has applied across a broad range of applications, from residential heating equipment to automotive internal combustion engines to gas turbines to industrial and utility furnaces. The liquid fuel preparation method has a very significant impact on the resultant emissions, particularly emissions of carbon monoxide (CO), unburned hydrocarbons (HC) and soot. Thus in the drive to continuously reduce emissions from liquid fuel burning devices, there has been much effort directed at developing simple and cost-effective methods for achieving delivery of either vaporized fuel or very fine fuel droplets.

In any given liquid fuel combustion application, reduction of the droplet size can provide several benefits, including improved ignition characteristics, reduced droplet impingement on chamber walls, more rapid evaporation of the liquid droplets, reduced CO, HC and soot emissions, and the ability to operate with lower volatility (or heavier) liquid fuels. Though a fuel may be delivered to a combustion chamber in liquid droplet form, the liquid must evaporate before the fuel constituents can react with the oxygen in the combustion air. Large droplets evaporate slowly and may not have time to fully evaporate and react before exiting the combustion chamber, thereby resulting in higher emissions.

In particular, in the case of very small-scale combustion systems (less than, say, 10 kW heat release), the importance of achieving small droplet sizes is made all the more critical, especially for lower volatility fuels such as diesel or jet fuel. In addition, these small-scale systems require simple fuel delivery systems that do not use large amounts of power to prepare the fuel. Thus many of the conventional fuel delivery approaches (e.g. pressure atomization, twin-fluid or duplex atomization, ultrasonic atomization) cannot be applied to small-scale systems: flow rates are too high; droplets are too large, required supply pressures are too high or an additional atomizing fluid is required. Thus many small-scale combustion systems are limited to gaseous fuels.

A number of approaches to reduce the size of delivered fuel sprays have been proposed. For example, a combustion device wherein fuel is atomized by an ultrasonic atomizing device is disclosed in U.S. Pat. No. 5,127,822. According to this patent, atomizers have been proposed wherein fuel is supplied to a combustion chamber in fine droplets to accelerate vaporization of the fuel and reduce the time needed for steady combustion of the fuel.

U.S. Pat. No. 5,127,822 describes an arrangement wherein fuel is intended to be supplied at 5 cc/min and the fuel said to be atomized into droplets having a Sauter Mean Diameter (SMD) of 40 $\mu$m. Other atomizing techniques are proposed in U.S. Pat. Nos. 6,095,436 and 6,102,687. An ultrasonic atomizer intended for supplying fuel to an internal combustion engine is proposed in U.S. Pat. No. 4,986,248.

U.S. Pat. No. 4,013,396 proposes a fuel aerosolization apparatus wherein a hydrocarbon fuel (e.g., gasoline, fuel oil, kerosene, etc.) is to be dispensed into a condensation area to form an aerosol fuel said to exhibit relatively even sized droplets less than 1 $\mu$m in diameter. The aerosolized fuel is intended to be mixed with air to provide a desired air-fuel ratio and combusted in the combustion area of a burner. A heat exchanger is proposed to transfer heat from the combusted fuel to a heat-carrying medium such as air, gas, or liquid.

In U.S. Pat. No. 5,472,645, a fuel-vaporizing device is proposed to address certain problems associated with incomplete combustion of fuel aerosols in internal combustion engines. According to U.S. Pat. No. 5,472,645, because aerosol fuel droplets do not ignite and combust completely in internal combustion engines, unburned fuel residues are exhausted from the engine as pollutants such as hydrocarbons (HC), carbon monoxide (CO), and aldehydes with concomitant production of oxides of nitrogen ($NO_x$). U.S. Pat. No. 5,472,645 proposes to improve combustion of aerosol fuels by breaking liquid fuel down into an air and fluid stream of vaporized or gas-phase elements. These elements are said to contain some non-vaporized aerosols of higher molecular weight hydrocarbons, with the lighter fuel components said to quickly evaporate to the gas phase, mix with air and fed to an internal combustion engine. The heavier fuel portions are said to be transformed into a gas-phase-vaporized state before they can exit a cyclone vortex device and enter the intake manifold of the engine.

U.S. Pat. No. 4,344,404 proposes an apparatus for supplying aerosolized fuel droplets mixed with air to an internal combustion engine or burner, the fuel droplets said to have sizes of 0.5 to 1.5 $\mu$m. The liquid fuel in aerosol form is mixed with air in an air-fuel ratio of about 18:1, with the goal of reducing the levels of CO, HC and $NO_x$ emissions from the engine.

Several patents disclose techniques for vaporizing a liquid. For example: commonly assigned U.S. Pat. Nos. 5,743,251 and 6,234,167 disclose aerosol generators which vaporize a liquid in a heated capillary tube; U.S. Pat. No. 6,155,268 issued to Takeuchi discloses liquid flavoring supplied by capillary action through a flow passage to a heater disposed on an end of the flow passage to vaporize the liquid flavoring; U.S. Pat. No. 5,870,525 issued to Young discloses that liquid from a reservoir can be fed through a supply wick by capillary action to a boiler wick in which the liquid is heated and boiled to a vapor; and U.S. Pat. No. 6,195,504 issued to Horie et al. discloses heating a liquid in a flow passage to produce a vapor.

U.S. Pat. No. 3,716,416 discloses a fuel-metering device intended for use in a fuel cell system. The fuel cell system is intended to be self-regulating, producing power at a predetermined level. The proposed fuel metering system includes a capillary flow control device for throttling the fuel flow in response to the power output of the fuel cell, rather than to provide improved fuel preparation for subsequent combustion. Instead, the fuel is intended to be fed to the fuel cell for conversion to $H_2$. In a preferred embodiment, the capillary tubes are made of metal and the capillary itself is used as a resistor, which is in electrical contact with the power output of the fuel cell. Because the flow resistance of a vapor is greater than that of a liquid, the flow is throttled as the power output increases. The fuels suggested for use include any fluid that is easily transformed from a liquid to a vapor phase by applying heat and flows freely through a capillary. Vaporization appears to be achieved in the manner that vapor lock occurs in automotive engines.

U.S. Pat. No. 6,276,347 proposes a supercritical or near-supercritical atomizer and method for achieving atomization or vaporization of a liquid. The supercritical atomizer of U.S. Pat. No. 6,276,347 is said to enable the use of heavy fuels to fire small, light weight, low compression ratio, spark-ignition piston engines that typically burn gasoline. The atomizer is intended to create a spray of fine droplets from liquid, or liquid-like fuels, by moving the fuels toward their supercritical temperature and releasing the fuels into a region of lower pressure on the gas stability field in the phase diagram associated with the fuels, causing a fine atomization or vaporization of the fuel. Utility is disclosed for applications such as combustion engines, scientific equipment, chemical processing, waste disposal control, cleaning, etching, insect control, surface modification, humidification and vaporization.

To minimize decomposition, U.S. Pat. No. 6,276,347 proposes keeping the fuel below the supercritical temperature until passing the distal end of a restrictor for atomization. For certain applications, heating just the tip of the restrictor is desired to minimize the potential for chemical reactions or precipitations. This is said to reduce problems associated with impurities, reactants or materials in the fuel stream which otherwise tend to be driven out of solution, clogging lines and filters. Working at or near supercritical pressure suggests that the fuel supply system operate in the range of 300 to 800 psig. While the use of supercritical pressures and temperatures might reduce clogging of the atomizer, it appears to require the use of a relatively more expensive fuel pump, as well as fuel lines, fittings and the like that are capable of operating at these elevated pressures.

OBJECTS AND SUMMARY OF THE PREFERRED FORMS

One object is to provide a fuel preparation and delivery apparatus and method of delivering a vaporized stream of fuel to an application, without the need for operating fuel pressures above those found in typical automotive applications, a secondary atomizing fluid (e.g. air or steam), or high power consumption.

Another object is to provide a fuel preparation and delivery system and method that can produce vaporized streams of fuel to overcome the longstanding problems associated with the start-up of burners and engines.

It is a still further object to provide a fuel preparation and delivery system that can produce vaporized streams of fuel with a very short warm-up time.

These and other objects of the present invention will become apparent from the detailed description of the preferred forms set out below and now summarized as follows:

A preferred form of the apparatus and method for vaporizing a liquid fuel is intended to accomplish at least one or more of the aforementioned objects. One such form includes at least one capillary flow passage, the at least one capillary flow passage having an inlet end and an outlet end; a fluid control valve for placing the inlet end of the at least one capillary flow passage in fluid communication with the liquid fuel source and introducing the liquid fuel in a substantially liquid state; a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage; and means for cleaning deposits formed during operation of the apparatus.

One preferred form of the present invention provides a method of vaporizing fuel. The method includes the steps of supplying liquid fuel to at least one capillary flow passage; causing a stream of substantially vaporized fuel to pass through an outlet of the at least one capillary flow passage by heating the liquid fuel in the at least one capillary flow passage; and cleaning periodically the at least one capillary flow passage.

The capillary flow passage can include a capillary tube and the heat source can, in one preferred form, include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 $\mu$m or less.

One form of the means for cleaning can include an oxidizer control valve for placing the at least one capillary flow passage in fluid communication with an oxidizer, the heat source being operable to heat the oxidizer in the at least one capillary flow passage to a level sufficient to oxidize deposits formed during the heating of the liquid fuel. The oxidizer control valve serves to alternate between the introduction of liquid fuel and the introduction of oxidizer into the capillary flow passage and enable in-situ cleaning of the capillary flow passage when the oxidizer is introduced into the at least one capillary flow passage. The oxidizer is preferably selected from the group of air, exhaust gas, steam and mixtures thereof.

In another preferred form, the means for cleaning deposits can include means for abrading deposits formed during operation of the apparatus. The means for abrading deposits can include cleaning brushes disposed along a valve stem positioned within the capillary passage.

Yet another form of the means for cleaning deposits can include a solvent control valve for placing the at least one capillary flow passage in fluid communication with a solvent. The solvent control valve serves to alternate between the introduction of liquid fuel and the introduction of solvent into the capillary flow passage and enable in-situ cleaning of the capillary flow passage when the solvent is introduced into the at least one capillary flow passage.

BRIEF DESCRIPTION OF THE DRAWINGS

The invention is further explained in the description that follows with reference to the drawings illustrating, by way of non-limiting examples, various embodiments of the invention wherein:

FIG. 7A is an enlarged cross-sectional view of the capillary fuel injector of FIG. 7;

DESCRIPTION OF THE ILLUSTRATED EMBODIMENTS

Figure 1:
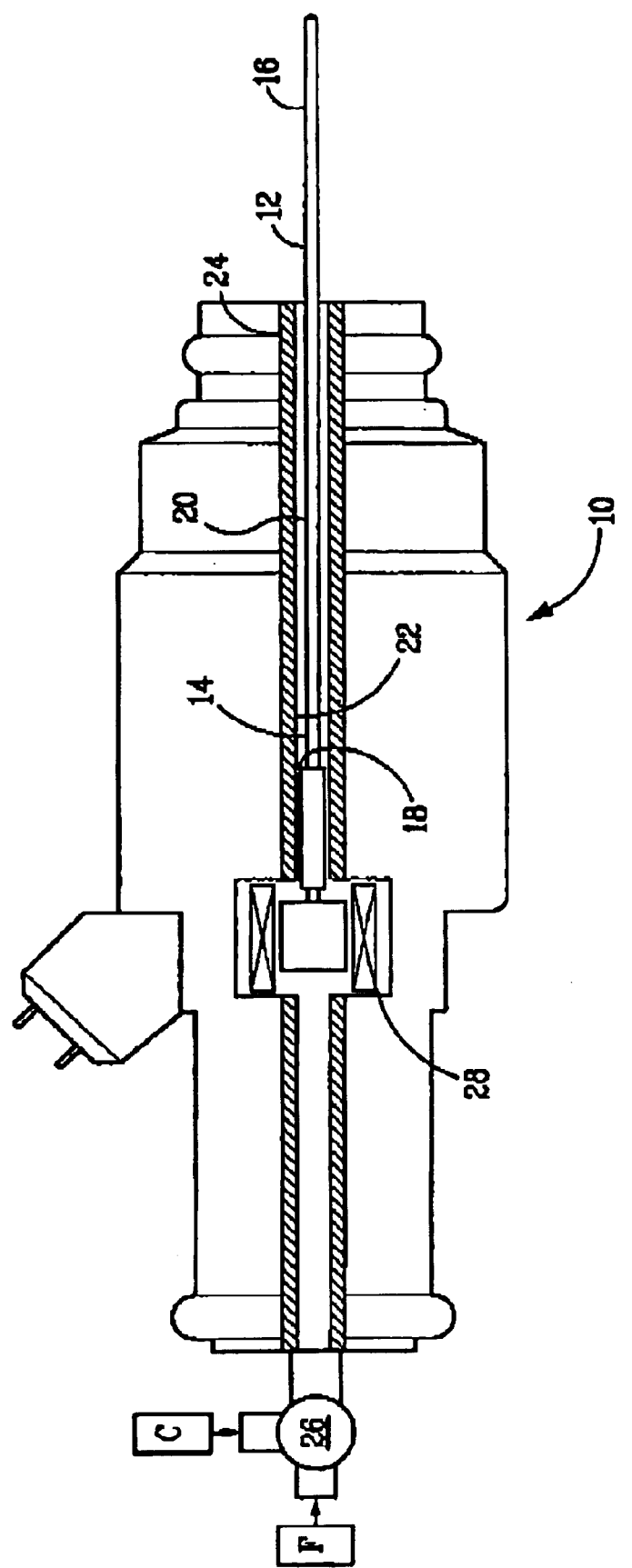
FIG. 1 is a single capillary fuel injector, capable of in-situ cleaning, in partial cut-away.
Figure 2:
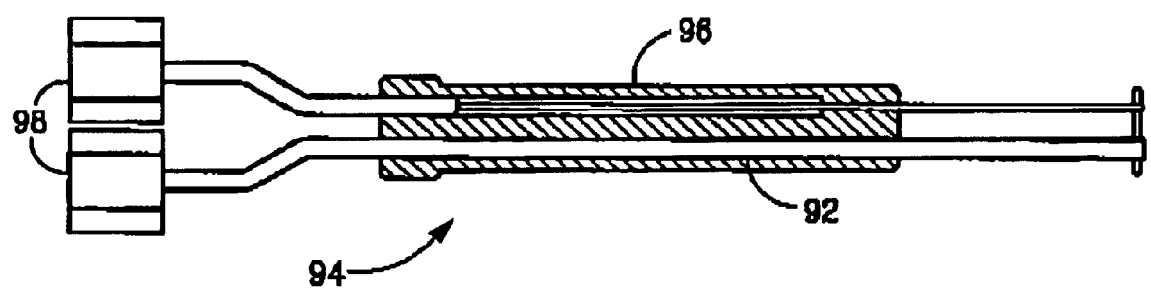
FIG. 2 shows a multi-capillary arrangement that can be used to implement the system shown in FIG. 4.
Figure 3:
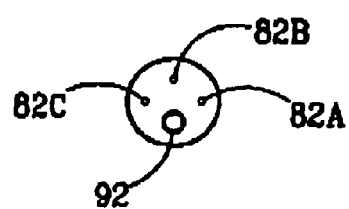
FIG. 3 shows an end view of the device shown in FIG. 2.
Figure 4:
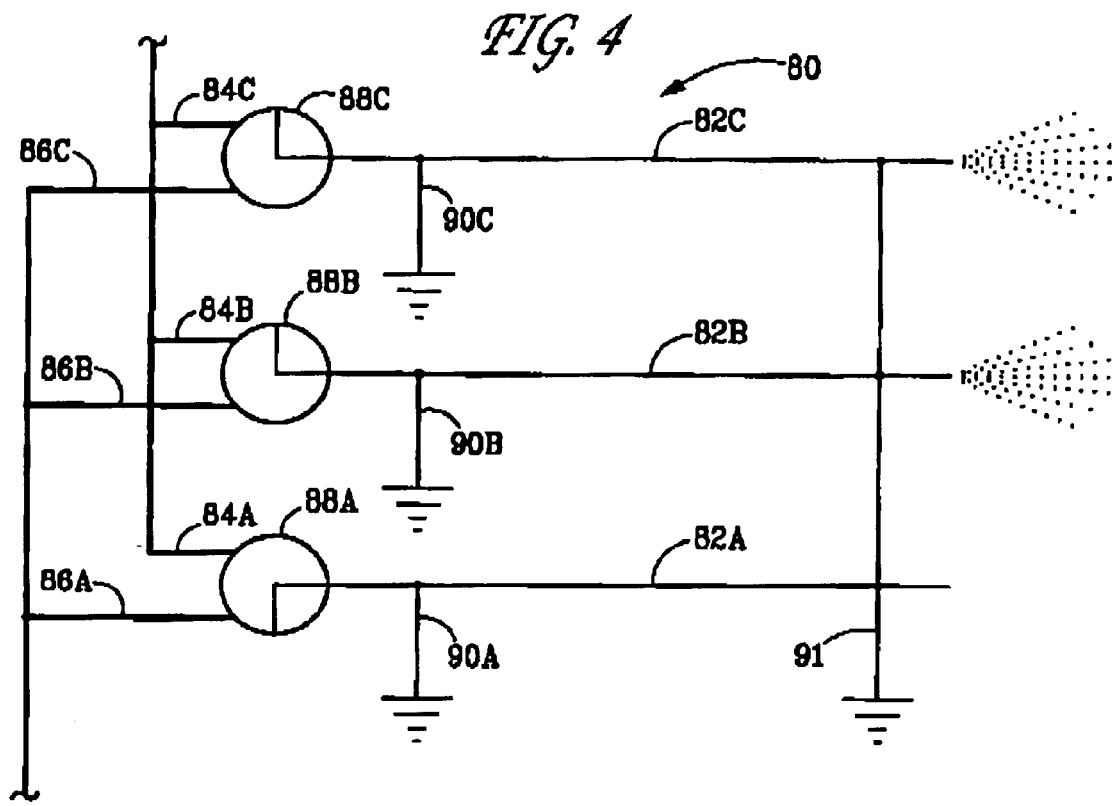
FIG. 4 shows details of a system that can be used to oxidize deposits in a multi-capillary arrangement that can be used to deliver vaporized fuel in accordance with the invention.

Reference is now made to the embodiments illustrated in FIGS. 1–13 wherein like numerals are used to designate like parts throughout.

The present invention provides a fuel delivery arrangement useful with virtually any application requiring a stream of atomized or vaporized liquid fuel. The liquid fuel can be any type of hydrocarbon fuel such as jet fuel, gasoline, kerosene or diesel fuel, as well as oxygenates such as methanol, ethanol, methyl tertiary butyl ether and blends of hydrocarbon fuels and oxygenates. The fuel delivery arrangement includes at least one capillary flow passage that can heat liquid fuel such that vaporized fuel or a mixture of vaporized fuel and optionally another fluid can be supplied to the application for subsequent combustion. Alternatively, the vaporized fuel can optionally be mixed with another fluid such as water or steam and supplied to a reformer or fuel processor. Advantageously, the fuel preparation and delivery apparatus of the present invention can be operated with low power and a very short warm-up time.

When starting engines that utilize conventional fuel systems, since relatively little vaporization of the liquid fuel takes place, it is necessary to provide an excess of liquid fuel to the application in order to achieve an air-fuel mixture that will readily ignite. Over-fueling typically results in undesirable exhaust emissions, including carbon monoxide, and unburned hydrocarbons. The degree of over-fueling is typically increased at lower engine starting temperatures, thereby exacerbating the exhaust emissions produced during starting.

The apparatus and method of the present invention can directly or indirectly deliver fuel that has been substantially vaporized to an engine for subsequent combustion, thereby reducing or eliminating the need for over-fueling during cold-start and warm-up conditions. Additionally, at normal operating temperatures of the engine, the air/fuel mixture can be controlled so that virtually all of the fuel is effectively burned, thereby reducing emissions.

In a preferred embodiment, the apparatus of the present invention is used with a liquid fuel supply which supplies liquid fuel, at least one capillary flow passage connected to the liquid fuel supply, and a heat source arranged along the at least one capillary flow passage. The heat source is operable to heat liquid fuel in the at least one capillary flow passage sufficiently to deliver a stream of substantially vaporized fuel which may optionally contain a minor proportion of heated liquid fuel which has not been vaporized. The fuel-vaporizing device is preferably operated to deliver a stream of vaporized fuel to the application.

The invention also provides a method of delivering fuel to an application for subsequent combustion, including the steps of supplying liquid fuel to at least one capillary flow passage, and heating the liquid fuel in the at least one capillary flow passage sufficiently to cause a stream of substantially vaporized fuel to be delivered to the application.

A fuel vaporizing system according to the invention includes at least one capillary-sized flow passage through which liquid fuel flows before being delivered to an application for combustion. Heat is applied along the capillary passageway, resulting in at least a portion of the liquid fuel that enters the flow passage being converted to a vapor as it travels along the passageway. The fuel exits the capillary passageway as a vapor, which may optionally contain a minor proportion of heated liquid fuel, which has not been vaporized. By "substantially vaporized" it is meant that at least 50% of the liquid fuel is vaporized by the heat source, preferably at least 70%, and most preferably at least 80% of the liquid fuel. The vaporized fuel can be mixed with air to form an aerosol having a mean droplet size of 25 $\mu$m or less, preferably 10 $\mu$m or less and more preferably 5 $\mu$m or less.

The capillary-sized fluid passage is preferably formed in a capillary body such as a single or multilayer metal, ceramic or glass body. The passage has an enclosed volume opening to an inlet and an outlet either of which may be open to the exterior of the capillary body or may be connected to another passage within the same body or another body or to fittings. As is most preferred to minimize thermal inertia, the heater can be formed by a portion of the body such as a section of a stainless steel tube or the heater can be a discrete layer or wire of resistance heating material incorporated in or on the capillary body. The fluid passage may be any shape having an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by its transverse cross sectional area of the passage which can be $8\times10^{-5}$ to 7 mm², preferably $8\times10^{-3}$ to $8\times10^{-1}$ mm² and more preferably $2\times10^{-3}$ to $2\times10^{-1}$ mm². Many combinations of single or multiple capillaries, various pressures, various capillary lengths, amounts of heat applied to the capillary, and different shapes and cross-sectional areas will suit a given application.

The capillary tube also is characterized by having low thermal inertia. By "low thermal inertia" it is meant that the body to be heated (the capillary tube) is of sufficiently low mass so as to require a minimal time to heat to operating temperature. As is preferred, the capillary passageway can be brought up to the desired temperature for vaporizing fuel very quickly, preferably within 2.0 seconds, more preferably within 0.5 second, and most preferably within 0.1 second, which is beneficial in applications where a delay in reaching the desired temperature would be undesirable such as during cold-start and warm-up conditions. Additionally, low thermal inertia can provide advantages during normal operation of an application, such as by improving the responsiveness of the application to sudden changes in power demands.

In one embodiment, the present invention provides a fuel preparation method and apparatus for liquid-fueled combustion applications. One combustion application is at very low liquid fuel flow rates, e.g., less than 0.1 grams per second, associated with combustion applications where other fuel preparation devices, such as, conventional pressure swirl atomization or air-blast atomization have proven to be either undesirable or unsuitable. The device is capable of generating fuel vapor and/or fuel aerosols having extremely small droplet diameters at flow rates ranging from a few tens to several thousand watts of chemical energy. Multiple capillaries may be used in parallel to increase total chemical energy output for use with larger combustion applications. The device can produce ultra-fine fuel aerosol and/or vapors, which are ideal for preparing homogeneous fuel/air mixtures for clean, efficient combustion in compact combustion systems, and exhibit excellent ignition characteristics.

Advantageously, the apparatus of the present invention can operate at low fuel supply pressure (100 psig or less) eliminating the need for high cost, heavy, power consuming high-pressure pumps, such as those required to supply fuel at or near the supercritical pressure of the fuel. Likewise, the apparatus of the present invention does not require higher air supply pressures eliminating the need for heavy, power consuming air movers. The apparatus may be used to provide liquid fuel powered pilot lights for furnaces, water heaters and the like, and serve a wide-variety of non-traditional liquid-fuel applications.

One advantage of the apparatus according to the invention is in its ignition energy requirement characteristics. Minimum ignition energy is a term used to describe the ease with which an atomized fuel/air mixture can be ignited, typically with an igniter such as a spark ignition source. The device according to the invention can provide vaporized fuel and/or aerosol with droplets having a Sauter Mean Diameter (SMD) of less than 25 $\mu$m, preferably less than 10 $\mu$m and more preferably less than 5 $\mu$m, such fine aerosols being useful to improve the start-up characteristics and flame stability in gas turbine and other combustion applications. Additionally, very significant reductions in minimum ignition energy can be achieved for fuels having values of SMD at or below 25 $\mu$m. For example, as discussed in Lefebvre, Gas Turbine Combustion (Hemisphere Publishing Corporation, 1983) at page 252, $E_{min}$, a term that correlates the ease with which an atomized fuel/air mixture may be ignited, is shown to sharply decrease as SMD decreases. Minimum ignition energy is roughly proportional to the cube of the Sauter Mean Diameter (SMD) of the fuel droplets in the aerosol. SMD is the diameter of a droplet whose surface-to-volume ratio is equal to that of the entire spray and relates to the mass transfer characteristics of the spray. The relationship between $E_{min}$ and SMD for various fuels is shown in Lefebvre to be roughly approximated by the following relationship:

$$\log E_{min} = 4.5(\log \text{SMD}) + k;$$

where $E_{min}$ is measured in mJoules,

SMD is measured in $\mu$m, and k is a constant related to fuel type.

According to Lefebvre, heavy fuel oil has a minimum ignition energy of about 800 mJ at a SMD of 115 $\mu$m and a minimum ignition energy of about 23 mJ at a SMD of 50 $\mu$m. Isooctane has a minimum ignition energy of about 9 mJ at a SMD of 90 $\mu$m and a minimum ignition energy of about 0.4 mJ at a SMD of 40 $\mu$m. For a diesel fuel, when SMD is equal to 100 $\mu$m, $E_{min}$ is about 100 mJ. A reduction in SMD to 30 $\mu$m would yield a reduction in $E_{min}$ to about 0.8 mJ. As may be appreciated, ignition system requirements are substantially reduced for SMD values below 25 $\mu$m.

It has been determined that the mass flow rate of liquid fuel through a capillary flow passage is dependent on the pressure of the liquid fuel entering the capillary flow passage and amount of heat applied to the capillary flow passage. The amount of vapor and droplet size of the fuel is also dependent on these two variables as discussed below, as well as on the thermal environment into which the vaporized fuel stream issues. The fuel vaporizing device of the present invention can be adapted for use in virtually all applications requiring a stream of substantially vaporized fuel by varying the length of the capillary flow passage, the cross sectional area of the capillary flow passage, the number of capillary flow passages used, the pressure of the fuel supplied to the capillary flow passage, and/or the amount of heat supplied to the capillary flow passage. It will be appreciated by those skilled in the art that empirical alteration of these variables will yield a configuration suitable for virtually any application requiring a heat source. It is contemplated that various pressures of less than 100 psig or even 50 psig or less may be applied to the liquid fuel source. Alternatively, no external source of pressure may be applied to the liquid fuel source for gravity-fed applications.

In applications where fuel-air mixtures are ignited proximate to an outlet of a fuel-vaporizing device, the emissions characteristics of combustion are sensitive to the quality of the fuel droplet size distribution. High quality, fine sprays promote fuel evaporation and enhance mixing, thereby reducing the tendency for rich combustion and the associated generation of smoke and soot. It is known that small droplets both evaporate rapidly and also follow flow streamlines very well and are therefore not prone to impact against burner walls. Conversely, large droplets can fail to follow flow streamlines and can impact burner walls and cause CO and hydrocarbon emissions and carbon deposits (coking). This problem is more noticeable in systems where the flames are highly confined. Therefore, the fuel vaporizing device of the present invention is beneficial in these applications because of its ability to produce a stream of vaporized fuel and/or an aerosol of very fine droplets, which are far less likely to be impacted on burner walls.

In applications where fuel is directed to a combustion chamber via an air flow, such as through the use of a manifold, it has been found that aerosol droplet sizes which are too large will be carried by an air stream until the air stream is diverted by a surface such as a manifold wall, at which point the droplets hit the surface and collect upon the wall. Depending on fuel type, droplets larger than 25 μm may be impacted on deflecting surfaces. Since some of the fuel is collected on the surface of the flow passage, extra fuel must be injected to deliver enough fuel vapor to the application for ignition to occur. Ultimately, the collected fuel is incompletely burned and exhausted as unburned fuel and pollutants. In contrast, the capillary flow passage according to the invention can provide an aerosol having a substantial amount of small sized aerosol droplets which is beneficial in that the small aerosol droplets can be carried by an air stream, regardless of the flow path, into the application and efficiently combusted with greatly reduced emissions.

During vaporization of liquid fuel in a heated capillary passage, deposits of carbon and/or heavy hydrocarbons can accumulate on the capillary walls and the flow of the fuel can be severely restricted, which ultimately can lead to clogging of the capillary flow passage. The rate at which these deposits accumulate is a function of capillary wall temperature, the fuel flow rate and the fuel type. It is believed that fuel additives may be useful in reducing such deposits. However, should clogging develop, such clogging can be cleaned by oxidizing the deposits.

FIG. 1 presents an apparatus 10 for vaporizing a liquid fuel drawn from a source of liquid fuel, in accordance with the present invention. Apparatus 10 includes a capillary flow passage 12, having an inlet end 14 and an outlet end 16. A fluid control valve 18 is provided for placing inlet end 14 of capillary flow passage 12 in fluid communication with a liquid fuel source F and introducing the liquid fuel in a substantially liquid state into capillary flow passage 12. As is preferred, fluid control valve 18 may be operated by solenoid 28. A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from the liquid state to a vapor state and deliver a stream of substantially vaporized fuel from outlet end 16 of capillary flow passage 12.

Apparatus 10 also includes means for cleaning deposits formed during operation of apparatus 10. The means for cleaning deposits shown in FIG. 1 includes fluid control valve 18, heat source 20 and an oxidizer control valve 26 for placing capillary flow passage 12 in fluid communication with a source of oxidizer C. As may be appreciated, the oxidizer control valve can be located at or near either end of capillary flow passage 12 or configured to be in fluid communication with either end of capillary flow passage 12. If the oxidizer control valve is located at or near the outlet end 16 of capillary flow passage 12, it then serves to place the source of oxidizer C in fluid communication with the outlet end 16 of capillary flow passage 12. In operation, heat source 20 is used to heat the oxidizer C in capillary flow passage 12 to a level sufficient to oxidize deposits formed during the heating of the liquid fuel F. In one embodiment, to switch from a fueling mode to a cleaning mode, the oxidizer control valve 26 serves to alternate between the introduction of liquid fuel F and the introduction of oxidizer C into capillary flow passage 12 and enable in-situ cleaning of capillary flow passage when the oxidizer is introduced into said at least one capillary flow passage.

One technique for oxidizing deposits includes passing air or steam through the capillary. The flow passage is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel delivery system, more than one capillary flow passage can be used such that when a clogged condition is detected, such as by the use of a sensor, fuel flow can be diverted to another capillary flow passage and oxidant flow initiated through the clogged capillary flow passage to be cleaned. As an example, a capillary body can include a plurality of capillary flow passages therein and a valving arrangement can be provided to selectively supply liquid fuel or air to each flow passage.

Alternatively, fuel flow can be diverted from a capillary flow passage and oxidant flow initiated at preset intervals. Fuel delivery to a capillary flow passage can be effected by a controller. For example, the controller can activate fuel delivery for a preset time period and deactivate fuel delivery after the preset amount of time. The controller may also effect adjustment of the pressure of the liquid fuel and/or the amount of heat supplied to the capillary flow passage based on one or more sensed conditions. The sensed conditions may include inter alia: the fuel pressure; the capillary temperature; and the air fuel mixture. The controller may also control multiple fuel delivery devices attached to the application. The controller may also control one or more capillary flow passages to clean deposits or clogs therefrom. For example, cleaning of a capillary flow passage can be achieved by applying heat to the capillary flow passage and supplying a flow of an oxidant source to the capillary flow passage.

The cleaning technique may also be applied to fuel vaporizing devices that are required to operate continuously. In this case, multiple capillary flow passages can be employed. An exemplary multiple capillary flow passage fuel vaporizing device of the present invention is illustrated in FIGS. 2 and 3. FIG. 2 presents a schematic view of a multi-capillary tube arrangement, integrated into a single assembly 94. FIG. 3 presents an end view of the assembly 94. As shown, the assembly can include the three capillary tubes 82A, 82B, 82C and a positive electrode 92 can include a solid stainless steel rod. The tubes and the rod can be supported in a body 96 of electrically insulating material and power can be supplied to the rod and capillary tubes via fittings 98. For example, direct current can be supplied to upstream ends of one or more of the capillary tubes and a connection 95 at the downstream ends thereof can form a return path for the current through rod 92.

Reference is made now to FIG. 4, wherein a multiple capillary tube system 80 includes capillary tubes 82A through C, fuel supply lines 84A through C, oxidizer supply lines 86A through C, oxidizer control valves 88A through C, power input lines 90A–C and common ground 91. The system 80 allows cleaning of one or more capillary tubes while fuel delivery continues with one or more other capillary tubes. For example, combustion of fuel via capillary flow passages 82B and 82C can be carried out during cleaning of capillary flow passage 82A. Cleaning of capillary flow passage 82A can be accomplished by shutting off the supply of fuel to capillary tube 82A, supplying air to capillary flow passage 82A with sufficient heating to oxidize deposits in the capillary flow passage. Thus, the cleaning of one or several capillaries can be carried out while continuously delivering fuel. The one or more capillary flow passages being cleaned are preferably heated during tie cleaning process by an electrical resistance heater or thermal feedback from the application. Again, the time period between cleanings for any given capillary flow passage may either be fixed based upon known clogging characteristics, determined experimentally, or a sensing and control system may be employed to detect deposit buildup and initiate the cleaning process as required.

Fuel delivery to a capillary flow passage can be controlled by a controller. For example, the controller can activate fuel delivery to an application, such as a spark-ignited internal combustion engine, a diesel engine, a burner, a Stirling engine, a gas turbine engine, etc., when operation of the application is to begin and deactivate fuel delivery after a preset amount of time or when a signal is received to deactivate the application. The controller may also adjust the pressure of the liquid fuel and/or the amount of heat supplied to the capillary flow passage based on one or more sensed conditions. The sensed conditions may include, inter alia: the manifold pressure; the fuel pressure; the capillary temperature; the application temperature; and the air fuel mixture at an exhaust outlet. The controller may also control multiple fuel vaporizing devices attached to an application. The controller may control one or more capillary flow passages to clean deposits or clogs therefrom. For instance, the controller may control more than one capillary flow passages to clean deposits or clogs therefrom for continuous operation of an application. The controller can divert fuel flow from a partially clogged capillary flow passage to one or more of the other capillary flow passages and initiate oxidizing gas flow and heat to the partially clogged capillary flow passage until the capillary flow passage is clean of deposits.

Figure 5:
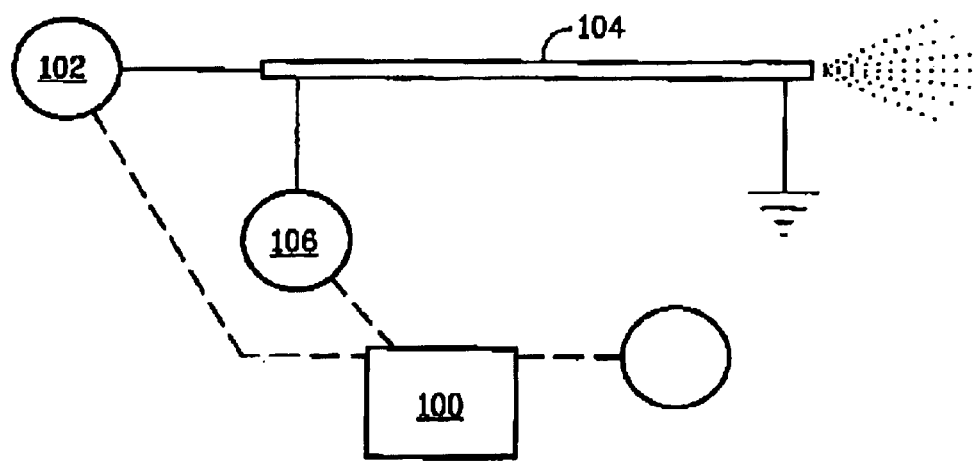
FIG. 5 shows a schematic of a control system to deliver fuel and optionally oxidizing gas to a capillary flow passage.

FIG. 5 shows an exemplary schematic of a control system to operate a combustion system incorporating an oxidizing gas supply for cleaning clogged capillary passages in accordance with the invention. The control system includes a controller 100 operably connected to a fuel supply 102 that supplies fuel and optionally air to a flow passage such as a capillary tube 104. The controller is also operably connected to a power supply 106 that delivers power to a resistance heater or directly to a metal capillary tube 104 for heating the tube sufficiently to vaporize the fuel. If desired, the combustion system can include multiple flow passages and heaters operably connected to the controller 100. The controller 100 can be operably connected to one or more signal sending devices such as an on-off switch, thermocouple, fuel flow rate sensor, air flow rate sensor, power output sensor, battery charge sensor, etc. whereby the controller is 100 can be programmed to automatically control operation of the combustion system in response to the signal(s) outputted to the controller by the signal sending devices.

In operation, the device according to the invention can be configured to feed back heat produced during combustion such that the liquid fuel is heated sufficiently to substantially vaporize the liquid fuel as it passes through the capillary reducing or eliminating or supplementing the need to electrically or otherwise heat the capillary flow passage. For example, the capillary tube can be made longer to increase the surface area thereof for greater heat transfer, the capillary tube can be configured to pass through the combusting fuel, a heat exchanger can be arranged to use exhaust gas from the combustion reaction to preheat the fuel, etc.

Figure 6:
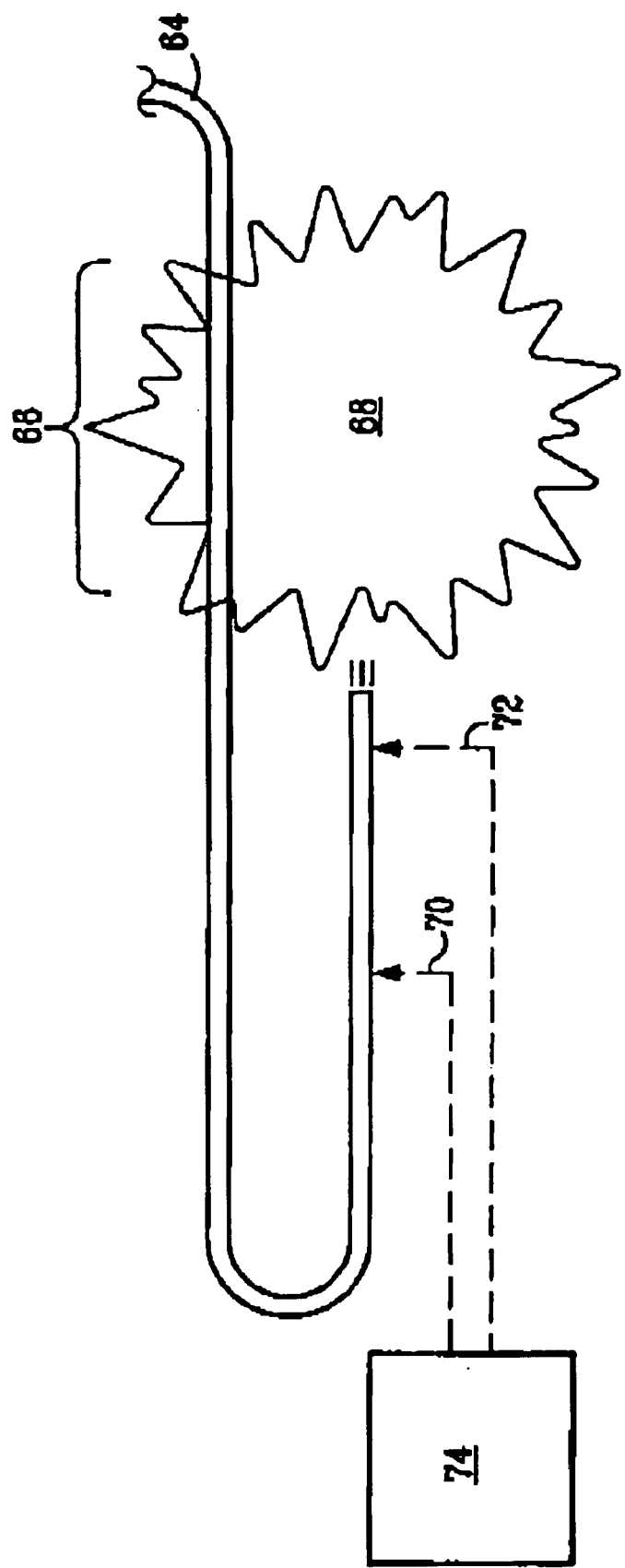
FIG. 6 shows a schematic of an arrangement for using combustion heat to preheat the liquid fuel.

FIG. 6 shows, in simplified form, how a capillary flow passage 64 can be arranged so that liquid fuel traveling therethrough can be heated to an elevated temperature to reduce power requirements of the fuel-vaporizing heater. As shown, a portion 66 of a tube comprising the capillary flow passage passes through the flame 68 of the combusted fuel. For initial start up, a resistance heater comprising a section of the tube or separate resistance heater heated by electrical leads 70, 72 connected to a power source such as a battery 74 can be used to initially vaporize the liquid fuel. After ignition of the vaporized fuel by a suitable ignition arrangement the portion 66 of the tube can be preheated by the heat of combustion to reduce the power otherwise needed for continued vaporization of the fuel by the resistance heater. Thus, by preheating the tube, the fuel in the tube can be vaporized without using the resistance heater whereby power can be conserved.

As will be appreciated, the apparatus and system for preparing and delivering fuel depicted in FIGS. 1 through 6 may also be used in connection with another embodiment of the present invention. Referring again to FIG. 1, the means for cleaning deposits includes fluid control valve 18 and a solvent control valve 26 (formerly the oxidizer control valve 26 in the embodiment employing oxidation cleaning) for placing capillary flow passage 12 in fluid communication with a solvent, the solvent control valve 26 disposed at one end of capillary flow passage 12. In one embodiment of the apparatus employing solvent cleaning, the solvent control valve alternates between the introduction of liquid fuel and the introduction of solvent into capillary flow passage 12, enabling the in-situ cleaning of capillary flow passage 12 when the solvent is introduced into capillary flow passage 12. While a wide variety of solvents have utility, the solvent may comprise liquid fuel from the liquid fuel source. When this is the case, no solvent control valve is required, as there is no need to alternate between fuel and solvent, and the heat source should be phased-out over time or deactivated during the cleaning of capillary flow passage 12.

Figure 7:
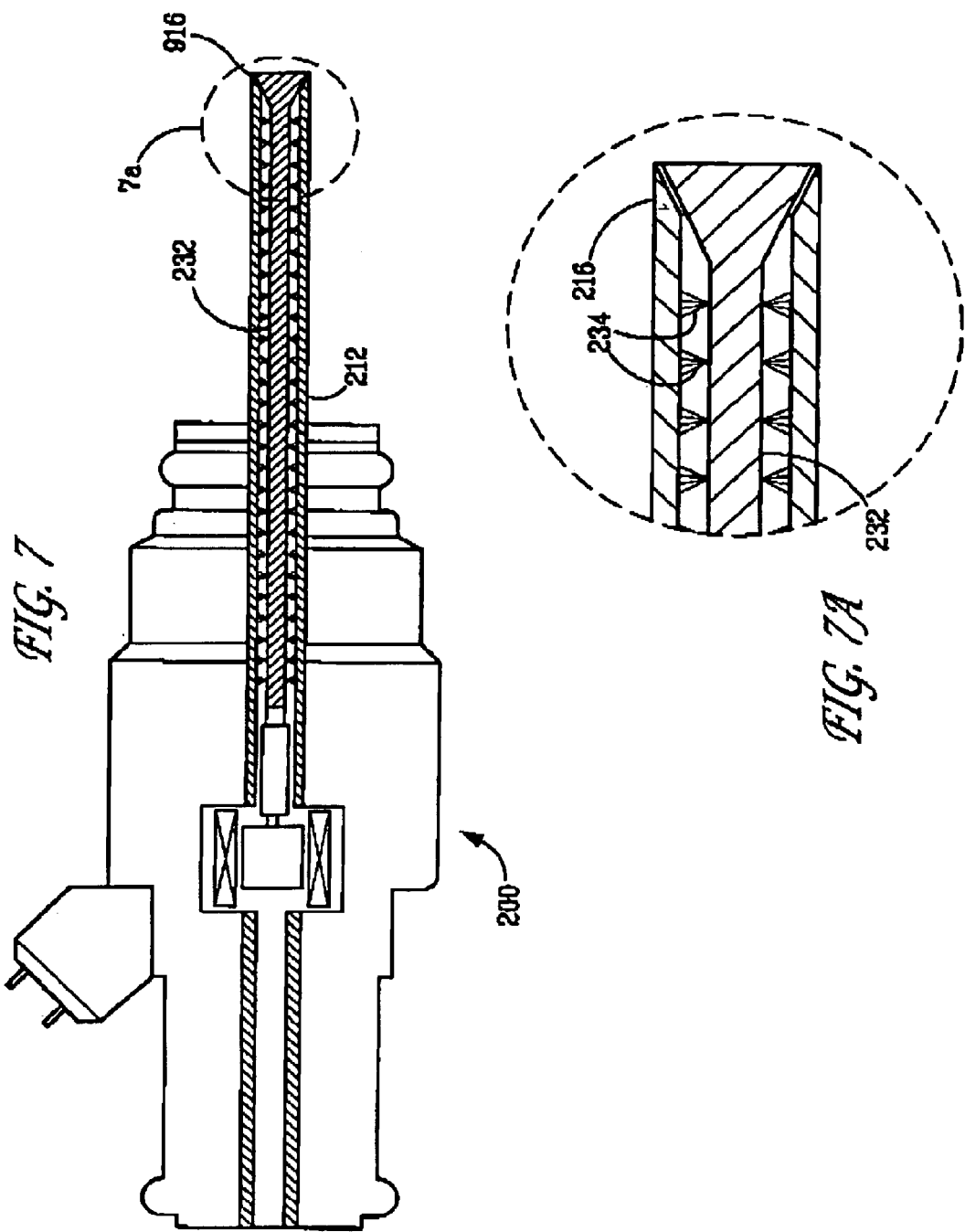
FIG. 7 is another single capillary fuel injector, capable of in-situ cleaning by abrading deposits formed within, in partial cut-away.

FIG. 7 presents another exemplary embodiment of the present invention. An apparatus 200 has a heated capillary flow passage 212 for delivering liquid fuel F to an application. Details of the capillary flow passage 212 for delivering fuel are illustrated by FIG. 7A. As shown therein, an axially moveable rod 232 is positioned inside of capillary flow passage 212. The outlet end 216 of capillary passage 212 is flared and the end of rod 232 is tapered to form a valve wherein axial movement of the rod 232 opens and closes the valve. Also arranged inside the tube are brushes 234 for cleaning the axially moving rod 232 as it reciprocates within the capillary flow passage 212.

According to another embodiment of the invention, the fuel-vaporizing device delivers substantially vaporized fuel that can be mixed with air at ambient temperature that is drawn into air supply passages leading into a combustion chamber of the application. Alternatively, the vaporized fuel can be mixed with air, which has been preheated such as by a heat exchanger, which preheats the air with heat of exhaust gases removed from a combustion chamber of the application. If desired, the air can be pressurized such as by a blower prior to mixing with the vaporized fuel.

If desired, the fuel vaporizing method and device of the present invention could be used in any application or apparatus that requires a stream of vaporized fuel. For instance, such applications include, but are not limited to, water heaters and furnaces, portable heaters, energy conversion devices, internal combustion engines, refrigerators, fuel processors or reformers, external combustion engines, gas turbines, fuel cells, direct thermal conversion devices, etc. The present invention may also be applied to applications where cleaner burning of the liquid fuel is desirable.

EXAMPLES

Example 1

Tests were performed wherein JP 8 jet fuel was vaporized by supplying the fuel to a heated capillary passage at constant pressure with a micro-diaphragm pump system. In these tests, capillary tubes of different diameters and lengths were used. The tubes were constructed of 304 stainless steel having lengths of 1 to 3 inches and internal diameters (ID) and outer diameters (OD), in inches, as follows: 0.010 ID/0.018 OD, 0.013 ID/0.033 OD, and 0.017 ID/0.025 OD. Heat for vaporizing the liquid fuel was generated by passing electrical current through a portion of the metal tube. The droplet size distribution was measured using a Spray-Tech laser diffraction system manufactured by Malvern. Droplets having a Sauter Mean Diameter (SMD) of between 1.7 and 4.0 $\mu$m were produced. SMD is the diameter of a droplet whose surface-to-volume ratio is equal to that of the entire spray and relates to the spray's mass transfer characteristics.

Example 2

Tests were conducted to demonstrate the benefits of the oxidation cleaning technique on a heated capillary flow passage using an unadditized, sulfur-free base gasoline known to produce high levels of deposit formation. The capillary flow passage employed for these tests was a two-inch long heated capillary tube constructed of stainless steel, having an inner diameter of 0.023 inch. Fuel pressure was maintained at 10 psig. Power was supplied to the capillary to achieve various levels of $R/R_o$; where R is the heated capillary resistance and $R_o$ is the capillary resistance under ambient conditions.

Figure 8:
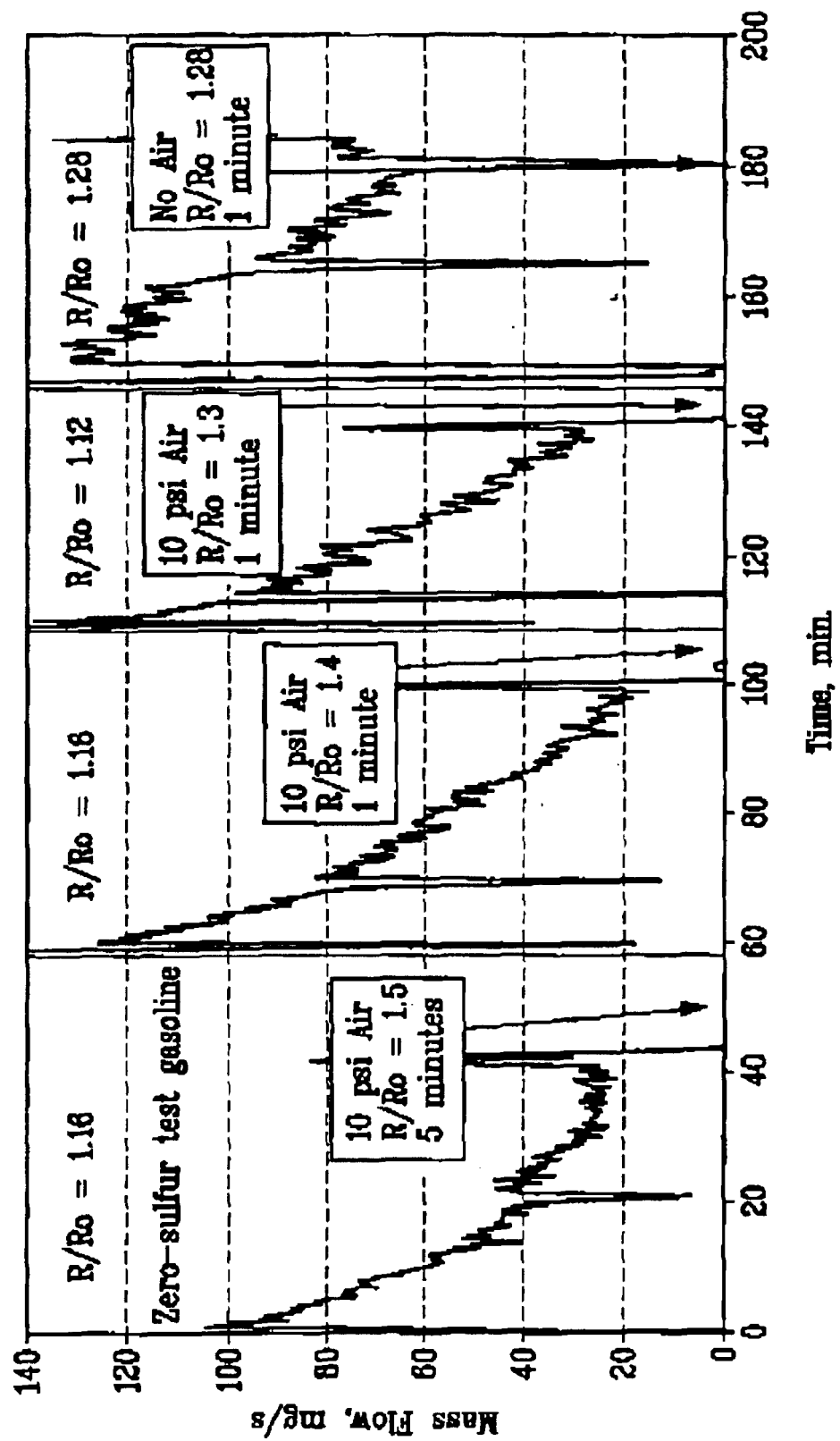
FIG. 8 presents a graph of fuel flow rate vs. time for an unadditized gasoline, demonstrating the benefits of oxidation cleaning.

FIG. 8 presents a graph of fuel flow rate vs. time. As shown, for this gasoline containing no detergent additive, significant clogging was experienced in a very short period of time, with a 50% loss in flow rate observed in as little as 10 minutes.

After substantial clogging was experienced, fuel flow was discontinued and air at 10 psig substituted. Heating was provided during this period and, in as little as one minute later, significant cleaning was achieved, with flow rates returning to prior levels.

Example 3

Figure 9:
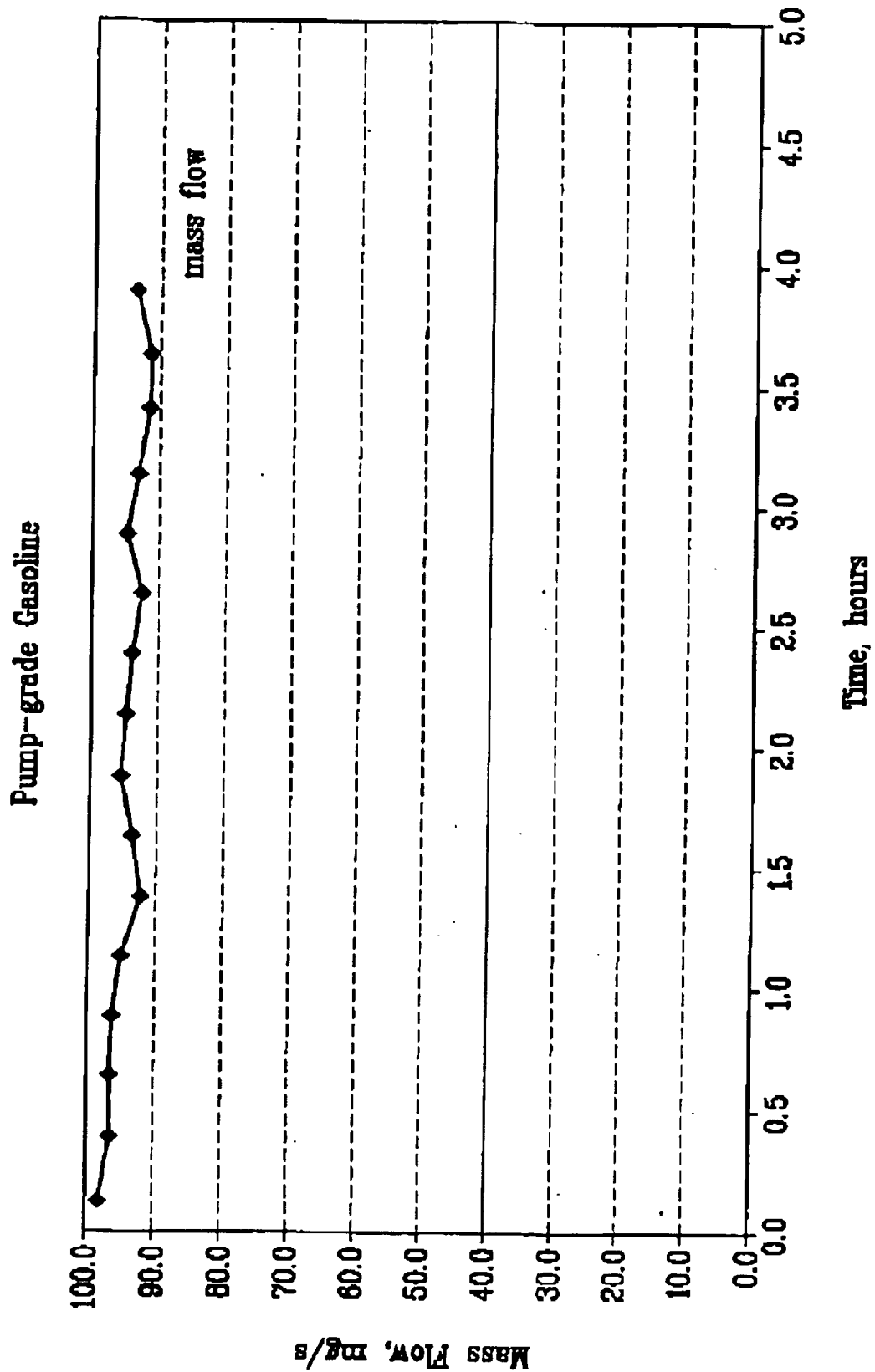
FIG. 9 is a graph of fuel flow rate vs. time for a commercial-grade gasoline.

This example demonstrates that clogging is far less severe in the heated capillary flow passage of Example 2, when a commercial-grade gasoline employing an effective additive package is employed. As shown in FIG. 9, less than a 10% reduction in fuel flow rate was experienced after running the device for nearly four hours.

Example 4

To compare various gasolines and the impact of detergent additives on clogging, five test fuels were run in the heated capillary flow passage of Example 2. The fuels tested included an unadditized base gasoline containing 300 ppm sulfur, an unadditized base gasoline containing no sulfur, the sulfur-free base gasoline with a commercially available after-market additive (additive A) added and the sulfur-free base gasoline with another commercially available after-market additive (additive B) added.

Figure 10:
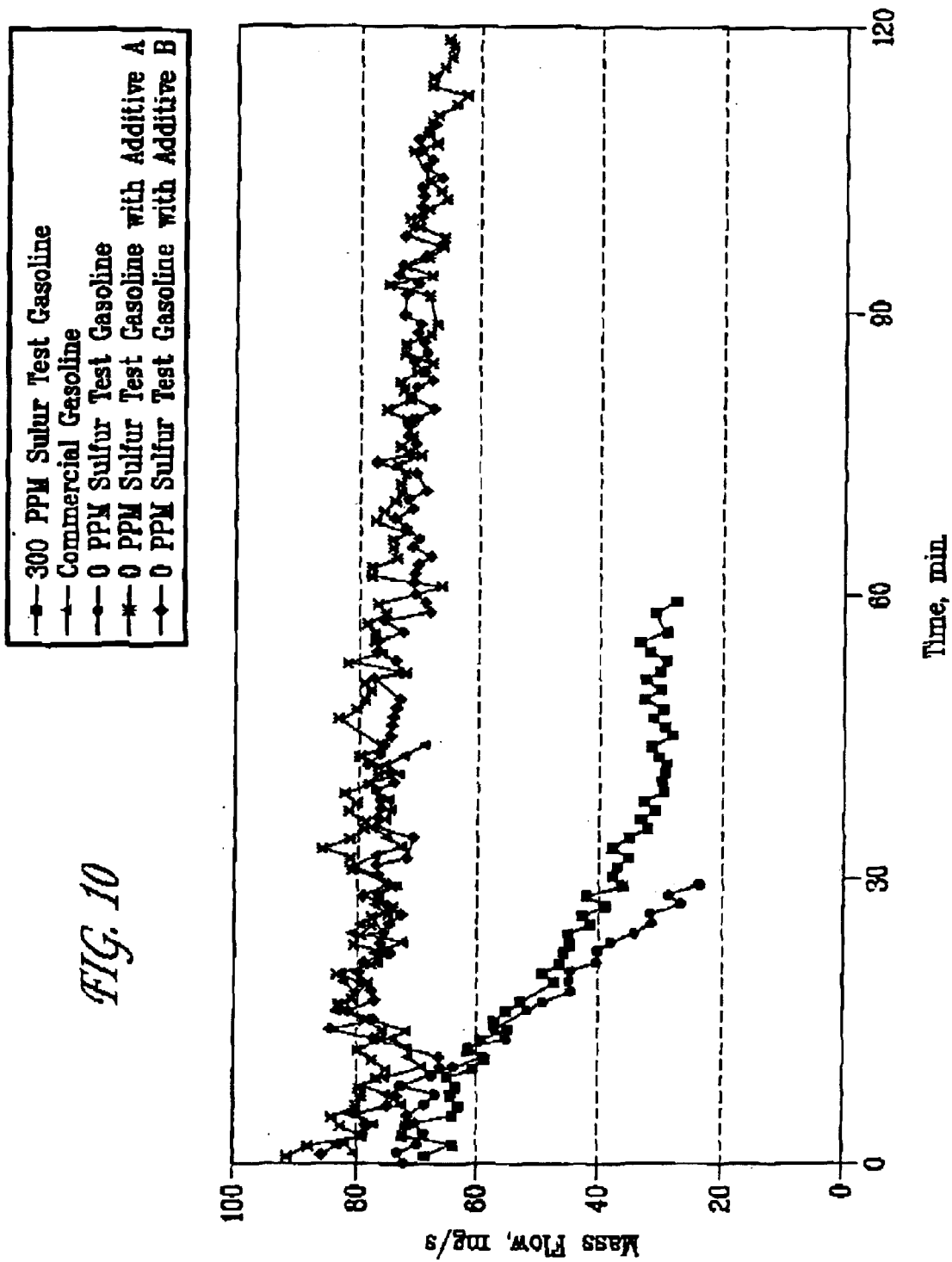
FIG. 10 presents a graph of fuel flow rate vs. time comparing various gasolines.

As shown in FIG. 10, the additized fuels performed similarly, while unadditized fuels experienced severe clogging in less than one hour of operation.

Example 5

This example compares the operation over time of a capillary flow passage operating on an unadditized jet fuel (JP-8) to the same capillary flow passage operating on an unadditized No. 2 diesel fuel operated in a capillary flow passage having an I.D. of 0.014 inch and a two inch length. Fuel pressure was set to 15 psig. Power was supplied to the capillary to achieve a level of $R/R_o$ of 1.19; where R is the heated capillary resistance and $R_o$ is the capillary resistance under ambient conditions.

Figure 11:
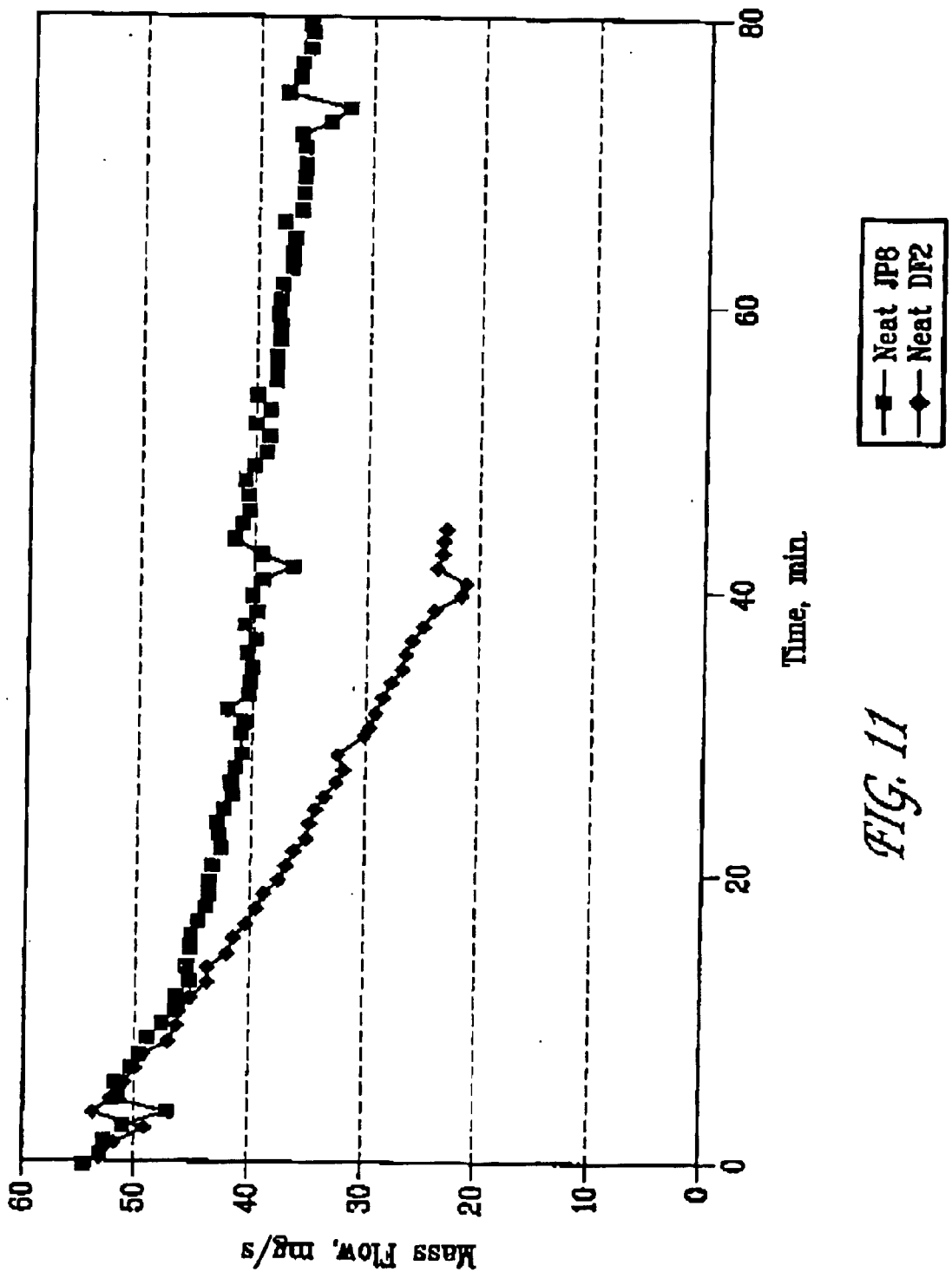
FIG. 11 is a graph of fuel flow rate vs. time comparing a jet fuel to a No. 2 diesel fuel.

As shown in FIG. 11, the fuels performed similarly over the first ten minutes of operation, with the diesel fuel suffering more severe clogging thereafter.

Example 6

Tests were conducted to assess the efficacy of the oxidation cleaning technique on a heated capillary flow passage using an unadditized, No. 2 diesel fuel known to produce high levels of deposit formation. The capillary flow passage employed for these tests was a two-inch long heated capillary tube constructed of stainless steel, having an inner diameter of 0.014 inch. Fuel pressure was maintained at 15 psig. Power was supplied to the capillary to achieve a level of $R/R_o$ of 1.19; where R, once again, is the heated capillary resistance and $R_o$ is the capillary resistance under ambient conditions.

Figure 12:
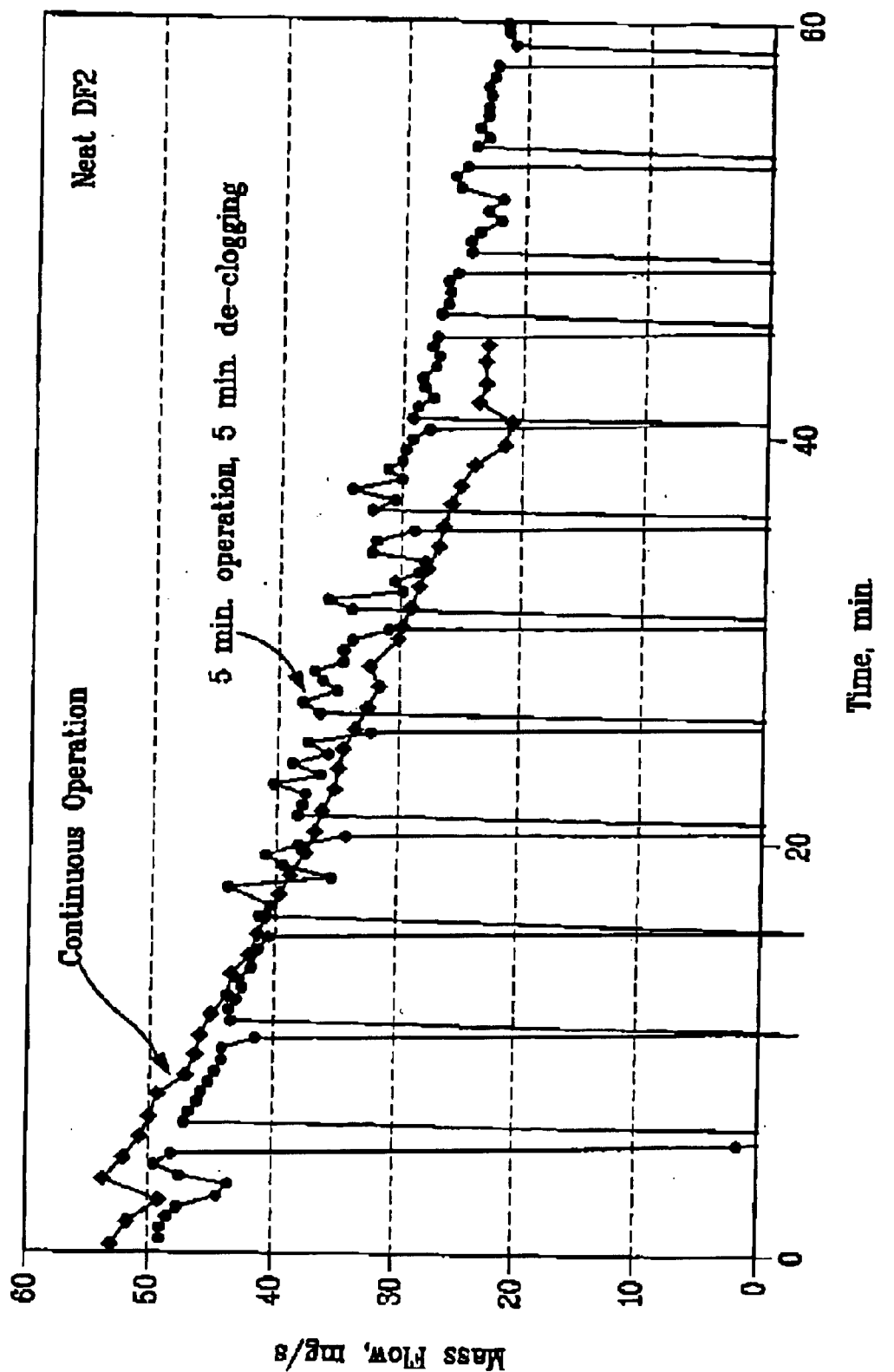
FIG. 12 presents a graph of fuel flow rate vs. time for an unadditized diesel fuel showing the effect of oxidation cleaning.

FIG. 12 presents a graph of fuel flow rate vs. time. As shown, for this fuel containing no detergent additive, significant clogging was experienced in a very short period of time, with a 50% loss in flow rate observed in about 35 minutes of continuous operation.

In a second run, after five minutes of operation, fuel flow was discontinued and air at 10 psig substituted for a period of five minutes. Heating was also provided during this period. This procedure was repeated every five minutes. As shown in FIG. 12, the oxidation cleaning process increased fuel flow rate in virtually every instance and tended to slow the overall decline in fuel flow rate over time. However, the efficacy of the process was somewhat less than was achieved using an unadditized gasoline, as described in Example 2.

Example 7

Tests were conducted to assess the effect of a commercial grade anti-fouling detergent additive blended with the No. 2 diesel fuel of Example 6 on fuel flow rate over time in a heated capillary flow passage. The capillary flow passage employed for these tests, once again, was a two-inch long heated capillary tube constructed of stainless steel, having an inner diameter of 0.014 inch. Fuel pressure was maintained at 15 psig and power was supplied to the capillary to achieve a level of $R/R_o$ of 1.19.

Figure 13:
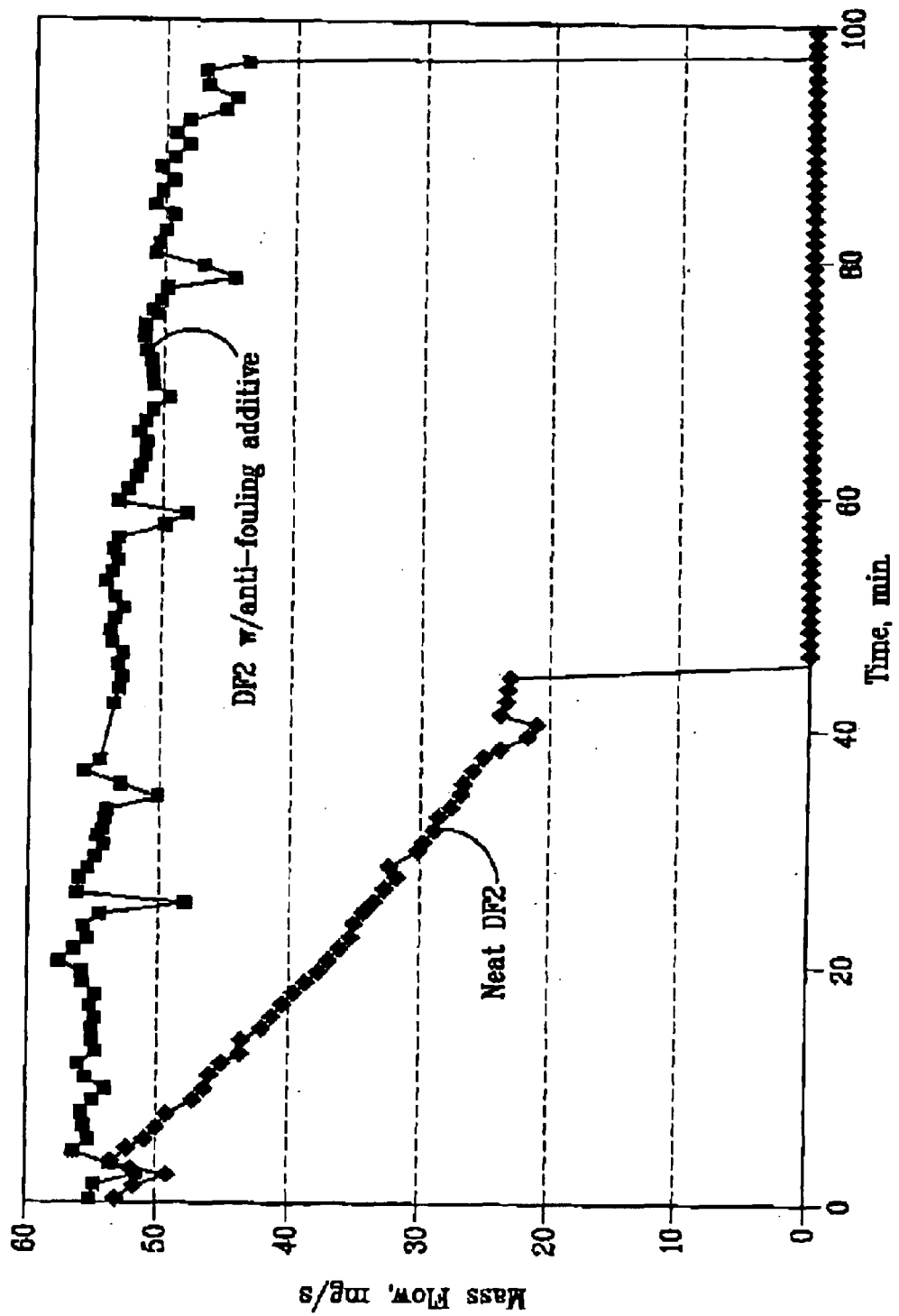
FIG. 13 is a graph of fuel flow rate vs. time comparing an unadditized diesel fuel to a diesel fuel containing an anti-fouling additive.

FIG. 13 presents a comparison of fuel flow rate vs. time for the additized No. 2 diesel fuel and an unadditized diesel fuel. As shown, for the fuel containing no detergent additive, significant clogging was experienced in a very short period of time, with a 50% loss in flow rate observed in about 35 minutes of continuous operation, while the same base fuel containing the detergent showed far less clogging over an extended period of time.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. An apparatus for vaporizing a liquid fuel drawn from a source of liquid fuel, comprising;
   (a) at least one capillary flow passage, said at least one capillary flow passage having an inlet end and an outlet end;
   (b) a fluid control valve for placing said inlet end of said at least one capillary flow passage in fluid communication with the liquid fuel source and introducing the liquid fuel in a substantially liquid state;
   (c) a heat source arranged along said at least one capillary flow passage, said heat source operable to heat the liquid fuel in said at least one capillary flow passage to a level sufficient to change at least a portion thereof from the liquid state to a vapor state and deliver a stream of substantially vaporized fuel from said outlet end of said at least one capillary flow passage; and
   (d) means for cleaning deposits formed during operation of the apparatus.

2. The apparatus of claim 1, wherein said means for cleaning deposits includes said fluid control valve, said heat source and an oxidizer control valve for placing said at least one capillary flow passage in fluid communication with an oxidizer, said heat source also being operable to heat the oxidizer in said at least one capillary flow passage to a level sufficient to oxidize deposits formed during the heating of the liquid fuel.

3. The apparatus of claim 2, wherein said oxidizer control valve for placing said at least one capillary flow passage in fluid communication with an oxidizer alternates between the introduction of liquid fuel and the introduction of oxidizer into said capillary flow passage to enable in-situ cleaning of said capillary flow passage when the oxidizer is introduced into said at least one capillary flow passage.

4. The apparatus of claim 2, wherein said at least one capillary flow passage includes a plurality of capillary flow passages, each of said capillary flow passages being in fluid communication with a supply of fuel and a supply of oxidizing gas.

5. The apparatus of claim 2, wherein the oxidizer is selected from the group consisting of air, exhaust gas, steam and mixtures thereof.

6. The apparatus of claim 1, wherein said means for cleaning deposits comprises means for abrading deposits formed during operation of the apparatus.

7. The apparatus of claim 6, wherein said fluid control valve comprises an axially movable valve stem extending at least a length of said at least one capillary flow passage, said valve stem having a cross-sectional area that is less than a cross-sectional area of an interior of said at least one capillary flow passage so that liquid fuel may flow past said valve stem and through said at least one capillary flow passage, said valve stem being movable such that a valve element at a downstream end of said valve stem opens and closes said outlet end of said capillary flow passage.

8. The apparatus of claim 1, wherein said fluid control valve comprises an axially movable valve stem extending at least a length of said at least one capillary flow passage, said valve stem having a cross-sectional area that is less than a cross-sectional area of an interior of said at least one capillary flow passage so that liquid fuel may flow past said valve stem and through said at least one capillary flow passage, said valve stem being movable such that a valve element at a downstream end of said valve stem opens and closes said outlet end of said capillary flow passage.

9. The apparatus of claim 7, wherein said means for abrading deposits comprises cleaning brushes disposed along said valve stern.

10. The apparatus of claim 1, wherein said means for cleaning deposits includes said fluid control valve and a solvent control valve for placing said at least one capillary flow passage in fluid communication with a solvent, said solvent control valve disposed at one end of said at least one capillary flow passage.

11. The apparatus of claim 10, wherein said solvent control valve for placing said at least one capillary flow passage in fluid communication with a solvent alternates between the introduction of liquid fuel and the introduction of solvent into said capillary flow passage to enable in-situ cleaning of said capillary flow passage when the solvent is introduced into said at least one capillary flow passage.

12. The apparatus of claim 1, wherein said means for cleaning deposits includes said fluid control valve, said fluid control valve operable for placing said at least one capillary flow passage in fluid communication with a solvent, enabling in-situ cleaning of said capillary flow passage when the solvent is introduced into said at least one capillary flow passage.

13. The apparatus of claim 12, wherein the solvent comprises liquid fuel from the liquid fuel source and wherein the heat source is phased-out during cleaning of said capillary flow passage.

14. The apparatus of claim 1, wherein said fluid control valve controls the flow rate of liquid fuel from the liquid fuel source.

15. The apparatus of claim 1, wherein said at least one capillary flow passage comprises at least one capillary tube.

16. The apparatus of claim 15 wherein said heat source comprises a section of said capillary tube heated by passing an electrical current therethrough.

17. The apparatus of claim 1, wherein said heat source comprises a resistance-heating element.

18. The apparatus of claim 1, further comprising a fuel source, said fuel source capable of delivering pressurized liquid fuel to said at least one capillary flow passage at a pressure of 100 psig or less.

19. The apparatus of claim 1, wherein said heat source enables the stream of substantially vaporized fuel to mix with a gas upon exiting said outlet end of said at least one capillary flow passage to form an aerosol having a particle size distribution, a fraction of which is 25 $\mu$m or less.

20. The apparatus of claim 1, further comprising at least one combustion chamber in fluid communication with said outlet end of said at least one capillary flow passage, said at least one combustion chamber operable to combust the stream of fuel from said outlet end of said at least one capillary flow passage, wherein at least a portion of said at least one capillary flow passage is positioned to be heated by combustion products produced by said at least one combustion chamber.

21. The apparatus of claim 1, wherein the liquid fuel and the oxidizer are selectively supplied to the at least one capillary flow passage by a valve mechanism operated by a controller.

22. The apparatus of claim 21, wherein said controller activates and deactivates said heat source.

23. The apparatus of claim 21, further comprising at least one sensor connected to said controller wherein said controller determines pressure of the liquid fuel and a temperature produced by said heat source in response to a sensed condition detected by said at least one sensor.

24. A method of vaporizing fuel, comprising the steps of:

(a) supplying liquid fuel to at least one capillary flow passage;

(b) causing a stream of substantially vaporized fuel to pass through an outlet of the at least one capillary flow passage by heating the liquid fuel in the at least one capillary flow passage; and (c) cleaning periodically the at least one capillary flow passage.

25. The method of claim 24, wherein said periodic cleaning comprises (i) halting liquid fuel flow to the at least one capillary flow passage, (ii) supplying an oxidizer to the at least one capillary flow passage and (iii) heating the at least one capillary flow passage whereby deposits formed in the at least one capillary flow passage are oxidized.

26. The method of claim 25, further comprising selectively supplying fuel and oxidizer to the at least one capillary flow passage, wherein the supply selection is achieved by a valve mechanism operated by a controller.

27. The method of claim 26, wherein the oxidizer is selected from the group consisting of pressurized air, exhaust gas, steam and mixtures thereof.

28. The method of claim 24, wherein said capillary cleaning step includes abrading deposits formed during said heating of the liquid fuel.

29. The method of claim 28, wherein said deposit abrading utilizes cleaning brushes disposed on an interior surface of the at least one capillary flow passage.

30. The method of claim 24, wherein said periodic cleaning comprises (i) phasing-out said heating of the at least one capillary flow passage, (ii) supplying a solvent to the at least one capillary flow passage, whereby deposits formed in the at least one capillary flow passage are removed.

31. The method of claim 30, wherein the solvent includes liquid fuel from the liquid fuel source.

32. The method of claim 31, further comprising passing electrical current though the at least one capillary flow passage, wherein the at least one capillary flow passage includes at least one capillary tube of conductive material.

33. The method of claim 24, further comprising passing electrical current though the at least one capillary flow passage, wherein the at least one capillary is flow passage includes at least one capillary tube of conductive material.

34. The method of claim 24, further comprising passing electrical current through a resistance heater.

35. The method of claim 34, wherein the liquid fuel is supplied at a pressure of 100 psig or less to the at least one capillary flow passage and the fuel selected from the group consisting of hydrocarbon, oxygenates and mixtures thereof.

36. The method of claim 35, further comprising the steps of mixing the stream of substantially vaporized fuel with air and forming an aerosol having a particle size distribution, a fraction of which is 25 $\mu$m or less.

37. The method of claim 24, further comprising the steps of mixing the stream of substantially vaporized fuel with air and forming an aerosol having a particle size distribution, a fraction of which is 25 $\mu$m or less.

38. The method of claim 24, further comprising heating the liquid fuel in a portion of the at least one capillary flow passage with heat produced by conversion of the chemical energy in the vaporized fuel.

39. The method of claim 38, further comprising providing supplemental heating by an electrical resistance heater.

40. The method of claim 24, wherein the liquid fuel is supplied at a pressure of 100 psig or less to the at least one capillary flow passage and the fuel selected from the group consisting of hydrocarbon, oxygenates and mixtures thereof.

* * * * *